United States Patent Office
3,758,353
Patented Sept. 11, 1973

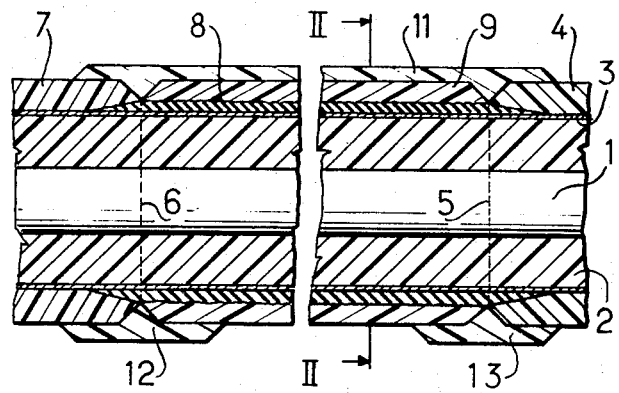

3,758,353
METHOD OF WELDING AN ELECTRIC CABLE SHEATHING, EMPLOYING A HEAT-SHRINKABLE THERMAL SCREEN
Claude Huriez, Calais, France, assignor to Cables de Lyon Alsacienne, Lyon, France
Filed Aug. 13, 1970, Ser. No. 63,373
Claims priority, application France, Aug. 13, 1969, 6927889
Int. Cl. B32b *31/00;* H01b *13/06*
U.S. Cl. 156—52                    9 Claims

ABSTRACT OF THE DISCLOSURE

A heat-shrinkable thermal screen of thermoplastic material is positioned on a portion of a cable requiring reconstitution, and thermally controlled prior to welding a fresh sheathing portion about the screen covered cable portion.

BACKGROUND OF THE INVENTION

Field of the invention

The present invention relates to a welding method for reconstituting the protective insulating sheathing of an electric cable and concerns more particularly the interposition of a heat-shrinkable thermal screen between that portion of the cable from which the original sheathing has been removed and the device for the reconstitution of the sheathing.

Description of the prior art

The sheathing of a cable is interrupted on the one hand systematically at its ends in order that it may be joined to the adjacent cable sections or connected to switchgear, and on the other hand, at random between its two ends, by reason of manufacturing defects or subsequent damage.

It is essential to repair an interrupted sheathing in order to restore the protective function, notably waterproofing, which prevents the penetration of harmful fluids, such as moisture.

It is known to employ for such waterproofing a mass of non-hygroscopic, waterproof and non-fusible sealing compound which is disposed at two ends of a tubular heat-shrinkable sleeve which is applied to the cable by heating and compresses the mass.

However, although the protective junction is restored, the geometrical continuity is not, which is a weak point in a cable, whereby the necessary operating reliability is substantially impaired.

It has been proposed, notably for submarine or underwater cables employed in telecommunications and in the transmission of energy, to reconstitute the protective sheathing so as to restore a cable to its integral condition from both the geometrical and physical viewpoints, by welding to the latter, in place of the damaged portion of the sheathing, a cylindrical sheathing element which has the same dimensions and which is longitudinally split to enable it to be positioned thereon.

However, tests made up to the present have not shown any satisfactory reconstitution, because the three welds which have to be made, i.e. two radial welds and one longitudinal weld, require considerable heating for which there must be employed as the radiation means the contacting metal which is to be protected and the heating of which may weaken the subjacent insulation of the cable.

In order to protect the metal from the heat transmitted by the injection mould employed in effectively welding of the lines of discontinuity of the fitted-on sheathing. It has been proposed to employ a thermal screen, usually consisting of polytetrafluoroethylene, but the pressure applied in the course of the said moulding deforms the screen along the welding lines, whereby the uniformity of the latter is destroyed.

If a welding gun is employed to apply hot thermoplastic material in order to avoid the pressure effect, the degradation of the subjacent portion of the cable is in fact diminished, but the quality of the weld is lower by reason of the lower homogeneity of the mass thus formed.

SUMMARY OF THE INVENTION

One of the objects of the present invention is to eliminate these various disadvantages by employing as the thermal screen a heat-shrinkable screen, the two properties of which are simultaneously utilized. These properties are, on the one hand, the thermal insulation, by which the subjacent portion of the cable is preserved, notably the insulation of the cable disposed immediately below the metallic envelope to be enclosed in the sheathing, and on the other hand the shrinkage under the action of heat, whereby the screen is maintained in tension during the moulding operation by which permanent contact is established between the screen and the envelope, to the shape of which it completely adapts itself. The two contradictory aspects of the problem posed are now resolved, with the result that a reconstitution of the thermoplastic sheathing to its manufactured geometrical form is combined with the maintenance of the subjacent cable in its initial integral form, whereby the original reliability of the cable is preserved.

The method of welding the insulating sheathing of an electric cable with the aid of a thermal screen in accordance with the invention is characterized in that, for ensuring geometrical continuity and the physically integral state of the cable, the thermal screen is heat-shrinkable and is so disposed as to be applied to the metal to be protected and held fast thereon by thermal contraction. Thereafter, it is covered by a fresh sheathing portion which is substituted for an original portion, and is subjected to welding. The term "welding," as used in the description of the present invention refers to the formation of a continuous piece of sheathing by well-known processes, which may be either application of molten material to that portion of the sheathing to be joined by molding or direct application to a seam or by the application of heat to the sheath to melt the edges thereof, which upon cooling will form a continuous sealed piece of material. Such welding and molding processes are widely known to those skilled in the art.

The advantages afforded by this new method are utilized notably by applying it to submarine cables in which the continuity of the sheathings is essential having regard to their environment and the conditions in which they are laid and employed, and should be maintained as long as possible before the cables are raised.

BRIEF DESCRIPTION OF THE DRAWINGS

In order to illustrate more clearly the objects and advantages of the present invention, the application thereof to submarine cables will now be described by way of non-limiting example, with reference to the drawings, in which:

FIG. 1 is a fragmentary, longitudinal, sectional view of one end of a coaxial transmission cable whose sheathing has been reconstituted in accordance with the invention.

FIG. 2 is a transverse sectional view along the line II—II of FIG. 1.

FIG. 3 is a view in perspective of a three-phase energy cable.

FIG. 4 is a transverse sectional view, drawn to a larger scale, along the line IV—IV of one of the phases of FIG. 3.

DESCRIPTION OF THE PREFERRED EMBODIMENT

In FIGS. 1 and 2, the coaxial submarine transmission cable is diagrammatically represented by four elements, namely the central conductor 1, of copper, the polyethylene insulation 2, the copper peripheral conductor 3 and the polyethylene sheathing 4 covering the latter.

At that end of the cable which is shown to the left of the cross-sectional plane 5, the sheathing 4 has been removed and the end of the cable has been covered, as far as the cross-section plane 6, by an end portion 7 also consisting of polyethylene. In accordance with the method, there has been applied a heat-shrinkable polyethylene sheathing 8 whose length is slightly greater than the distance between the cross-sectional planes 5 and 6 and whose width is substantially twice that of 8, representing the thermal screen after the contracting operation. In fact, the contracting operation takes place in three phases: the left-hand end of the heat-shrinkable sheathing 8 is contracted over a small length after the surface of the heat-shrinkable sheathing has been roughened by means of corundum cloth and after a bevel has been cut on its end and the bevelled end has been slid under the member 7; then, the right-hand end is slid under the original sheathing 4 after bevelling of the end and roughening with corundum, with the right-hand end of the heat-shrinkable sheathing 8 then being contracted by the application of heat thereto. Finally the remainder of the sheathing is contracted, care being taken that no air is left enclosed between the sheathing and the metal, and the sheathing is obtained in its final form shown at 8, which is roughened with Carborundum paper before being covered by the polyethylene sheathing portion 9 constituted by a cable sheathing longitudinally incised at 10 and forming a spacing means between the sheathing 4 of the cable and the fitted-on portion 7.

The end of the cable is then ready for the welding of the sheathing 9 to its periphery formed, on the one hand, of the longitudinal incision 10 on which the slightly projecting polyethylene portion 11 is formed by injection moulding, and on the other hand of the two radial sections in the planes 5 and 6, on which the slightly projecting polyethylene portions 12 and 13 are formed by injection moulding with the aid of corresponding moulds. As set forth hereinabove, the term "welding" refers to well-known processes for joining plastic, such as by direct application of heat to the edges to be joined to melt said edges or by application of molten plastic to the joint by the use of molds or by applying the molten plastic directly thereto by injection guns, etc. It will be obvious that it is possible to form in one operation the mouldings of the members 12 and 13 applied to the member 11 with the aid of an appropriate mould and of an appropriate press.

FIG. 3 diagrammatically illustrates the end of a three-phase submarine energy cable, in which the ends of the three respective phases 14, 15 and 16 of unequal lengths extend from a common protective sheathing 17. In fact, the conductors 14a, 15a and 16a are separately insulated and their are therefore three elemental cables disposed under a common sheathing and the problem of reconstituting the protective sheathing of each of these cables is reduced to that of the coaxial cable illustrated in FIGS. 1 and 2.

In FIG. 4, the phase 15 is shown in cross-section along the line IV—IV, to a large scale. This elemental cable is diagrammatically represented by the central conductor 15a surrounded by a semiconducting screen 18 for regularizing the electric field, which screen is insulated with extruded polyethylene 19 surrounded by a metallic screen 20 formed of copper strips or, if desired, of a lead sheathing, to which there is applied a thermoplastic sheathing 21 consisting of polyethylene or if desired of polyvinyl chloride. For reference purposes, there is indicated by dotted lines, the longitudinal incision 22 which would be made, for the purpose of the reconstitution of the sheathing, in the portion to be fitted onto the metallic screen when the latter has been covered by a heat-shrinkable envelope 8' to permit completely safe welding of the portion 23 formed by a longitudinal moulding and completed, as in the previous case, by the moulding of radial portions 8' to the two ends of the member 23.

It is to be noted that the invention is not limited to the particular embodiment which has just been described, but includes all possible variants conforming with the general definition of the invention as given in the foregoing.

Thus, for the uniformity of the reconstitution of the sheathing, it is advantageous to choose, if it exists, a shrinkable product of the same chemical composition as the sheathing to be reconstituted, this being possible when the sheathing consists of polyolefin, which is the chemical group to which polyethylene belongs, of polyvinyl chloride, of polyvinylidene fluoride, of polytetrafluoroethylene, of neopren, of silicone rubber or of butyl rubber, all of which products can be found in heat-shrinkable form. Otherwise, there will be chosen, when there is no equivalent to the sheathing, a heat-shrinkable product which is miscible, during the welding, with the product of which the sheathing consists.

A tubular heat-shrinkable sheathing may be employed to reconstitute the ends, while especially in the case where a sheathing is to be repaired along the length of the cable it is advantageous to employ a heat-shrinkable strip, which will be wound with overlapping edges around the metal subjacent to the portion of sheathing to be reconstituted, using if desired a hot-spray welding gun.

Likewise, the method may be applied with advantage to submarine transmission and energy cables, but it is also generally applicable to land cables in all cases where reliability is of prime importance in the application under consideration.

What is claimed is:

1. In a method of welding individual portions of the outer insulating sheathing together of a coaxial conductor electric cable comprising coaxial concentric conductors separated by an interspersed inner plastic insulating sheathing and having an outer plastic insulation sheathing concentrically surrounding the outer conductor, the improvement comprising, for the purpose of ensuring the geometrical continuity and the physical integrity of the coaxial cable, the steps of:

removing a portion of the original outer plastic insulation sheathing from around the entire circumference of a predetermined section of the coaxial cable, disposing a heat-shrinkable thermal screen about the outer conductor to be protected, inserting the ends of the heat-shrinkable thermal screen between the outer conductor and the ends of the remaining outer plastic insulation sheathing, applying heat to the ends of the heat-shrinkable thermal screen to contract the ends thereof adjacent the surface of the outer conductor, applying heat to the center portion of the heat-shrinkable thermal screen to contract the mid-portion thereof to form a sealed surface around the outer conductor, covering said thermal screen with a fresh sheathing portion having the same dimensions of the removed portion of the original outer sheathing, and welding plastic material to said fresh sheathing portion to overlap the ends thereof and the ends of the remaining original outer sheathing along the seam therebetween to join and seal the edges of the fresh sheathing portion and the remaining original outer sheathing portions to provide a sealed joint between the fresh sheathing portion and the remaining original outer sheathings.

2. The welding method according to claim 1, wherein the heat-shrinkable screen consists of a material having the same chemical composition as the thermoplastic material of the cable sheathing to be reconstituted.

3. The welding method according to claim 1 for the reconstitution of the sheathing at the end of a cable, wherein the thermal screen is of tubular form and said method further includes the step of surface roughing said screen after contraction.

4. The welding method according to claim 1 for reconstituting a section of the sheathing along the length of a coaxial cable, wherein the step of disposing said screen formed on said material comprises winding a heat-shrinkable strip in an overlapping manner around the material to be protected and further comprising the step of roughening the surface of said heat-shrinkable strip after thermal contraction thereof.

5. The welding method according to claim 2, wherein the sheathing to be reconstituted and the thermal screen consists of polyethylene.

6. The welding method according to claim 2, wherein the sheathing to be reconstituted and the thermal screen consist of polyvinyl chloride.

7. The welding method according to claim 1, wherein the cable is a polyphase energy cable and each phase is protected by an individual sheathing, separately reconstituted at the end of the cable.

8. The welding method according to claim 2, wherein the cable is a polyphase energy cable and each phase is protected by an individual sheathing, separately reconstituted at the end of the cable.

9. The welding method according to claim 3, wherein the cable is a polyphase energy cable and each phase is protected by an individual sheathing, separately reconstituted at the end of the cable.

References Cited

UNITED STATES PATENTS

| 3,467,561 | 9/1969  | Waride      | 156—56 X     |
| 3,033,727 | 5/1962  | Cram et al. | 156—56       |
| 2,909,443 | 10/1959 | Wolinski    | 161—227 UX   |
| 3,130,256 | 4/1964  | Mildner     | 174—107 X    |
| 3,187,088 | 6/1965  | Warner      | 174—DIG. 008 |
| 3,332,813 | 7/1967  | Clarke      | 174—88 C     |

FOREIGN PATENTS

| 765,705   | 1/1957 | Great Britain. |              |
| 1,149,611 | 4/1969 | Great Britain  | 174—DIG. 008 |

OTHER REFERENCES

Plastics, November 1947, p. 42.

GEORGE F. LESMES, Primary Examiner

L. T. KENDELL, Assistant Examiner

U.S. Cl. X.R.

156—53, 56, 85, 86; 174—Dig. 8, 88 C, 88 R